United States Patent
Pognant-Gros et al.

(10) Patent No.: US 7,860,630 B2
(45) Date of Patent: Dec. 28, 2010

(54) METHOD AND DEVICE FOR CONTROLLING HEAT ENGINE TORQUE SATURATION IN AN INFINITELY VARIABLE TRANSMISSION WITH ELECTRIC SPEED SELECTOR

(75) Inventors: Philippe Pognant-Gros, Rueil Malmaison (FR); Thomas Turpin, Orsay (FR); Yves Pichon, Meudon (FR)

(73) Assignee: Renault S.A.S., Boulogne-Billancourt (FR)

( * ) Notice: Subject to any disclaimer, the term of this patent is extended or adjusted under 35 U.S.C. 154(b) by 603 days.

(21) Appl. No.: 11/722,617

(22) PCT Filed: Dec. 8, 2005

(86) PCT No.: PCT/FR2005/051061
§ 371 (c)(1),
(2), (4) Date: Mar. 4, 2008

(87) PCT Pub. No.: WO2006/070145
PCT Pub. Date: Jul. 6, 2006

(65) Prior Publication Data
US 2008/0146414 A1      Jun. 19, 2008

(30) Foreign Application Priority Data
Dec. 22, 2004   (FR)   .................... 0453144

(51) Int. Cl.
*G06F 19/00* (2006.01)
(52) U.S. Cl. ................ 701/51; 701/54; 701/58; 701/60; 477/65.285
(58) Field of Classification Search .................. 701/51, 701/54, 56, 60, 58; 477/3, 37; 180/65.25–65.285
See application file for complete search history.

(56) References Cited

U.S. PATENT DOCUMENTS

| 5,866,809 | A  | * | 2/1999 | Soderman ................ 73/114.15 |
| 6,342,252 | B1 | * | 1/2002 | Song et al. ................ 424/549 |
| 2007/0192008 | A1 | | 8/2007 | Pognant-Gros et al. |

FOREIGN PATENT DOCUMENTS

| EP | 1 255 175 | 11/2002 |
| FR | 2 855 108 | 11/2004 |
| WO | 2004 106100 | 12/2004 |

* cited by examiner

*Primary Examiner*—Richard M. Camby
(74) *Attorney, Agent, or Firm*—Oblon, Spivak, McClelland, Maier & Neustadt, L.L.P.

(57) ABSTRACT

A method for controlling an infinitely variable transmission with an electric speed selector, including a heat engine and at least two electric machines based on calculating an instantaneous operating point of the transmission defined by a speed reference of the heat engine and a wheel torque reference. The wheel torque reference is corrected in case of saturation of the heat engine, so as to eliminate the saturation.

13 Claims, 2 Drawing Sheets

Figure 1:
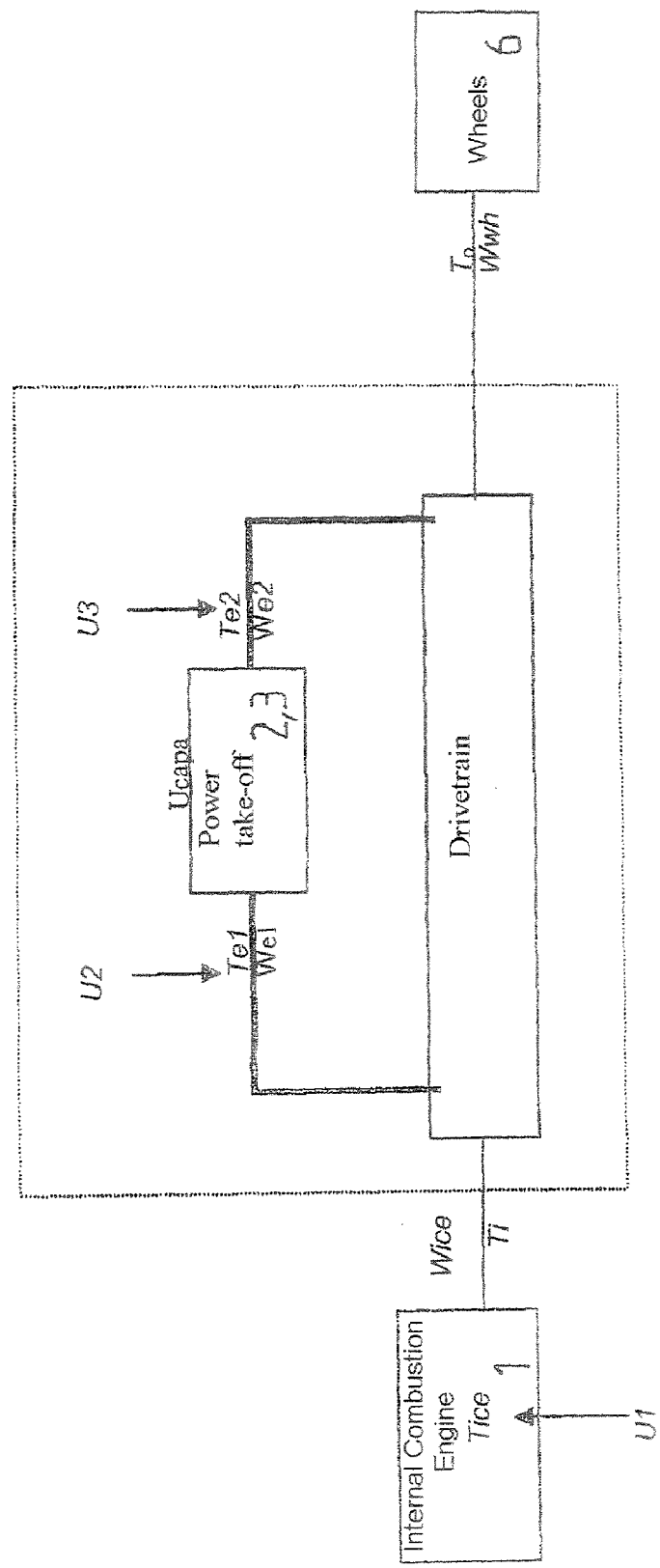

METHOD AND DEVICE FOR CONTROLLING HEAT ENGINE TORQUE SATURATION IN AN INFINITELY VARIABLE TRANSMISSION WITH ELECTRIC SPEED SELECTOR

The present invention relates to the control of infinitely variable transmissions with electric variators.

The subject of the present invention is more specifically a method for controlling an infinitely variable transmission with an electric variator, comprising an internal combustion engine and at least two electric machines, that relies upon calculating an instantaneous operating point of the transmission as defined by an internal combustion engine speed reference and a wheel torque reference pertaining to torque at the wheel.

This invention applies to a vehicle equipped with an internal combustion enqine and with an infinitely variable transmission with electric variator, which has the special feature of having no coupler, clutch or converter between the internal combustion engine and the transmission.

It finds a favored, although nonlimiting, application to a transmission device of the type comprising at least two parallel power transmission lines, one line containing a drivetrain with a fixed gear ratio, and another line comprising a continuous speed variator made up of two electric machines.

Publication FR 2 823 281 discloses a device of the abovementioned type, in which the various lines are connected, on the one hand, to an input mechanical splitter connected to a mechanical power source such as an internal combustion engine, and, on the other hand, to an output mechanical splitter connected to the wheels of the vehicle. The input and output mechanical splitters are preferably epicyclic gearsets, although this is not compulsory.

The transmission described in that publication thus comprises two electric machines connected by an energy buffer element, which are incorporated into a drivetrain that has four input and output shafts connected to the internal combustion engine, to the wheels and to the electric motors, respectively.

In a layout that is commonplace in this field, a transmission calculation unit produces command setpoints for each actuator (the two electric machines and the internal combustion engine as appropriate), so that the transmission can be placed at an operating point that is determined by calculation modules known as "higher supervisory levels".

As indicated above, the transmission operating point may be defined by an internal combustion engine speed reference and a wheel torque reference. In this case, the calculation unit tasked with producing the command setpoints for each actuator needs to observe performance specifications and be robust in the face of disturbances and measurement noise, while at the same time correctly regulating the energy buffer element.

In particular, the command needs to be able to adapt to the frequent occurrence whereby the internal combustion engine becomes saturated. What that means is that the torque demanded of the crankshaft is higher than the maximum permissible torque. Now, under heavy loads or if the operating point is calculated imprecisely, the calculated command can cause the internal combustion engine to become saturated. When this happens, the desired operating point is not achieved and the driver feels the consequences.

Failure to take this saturation into consideration means that the control device operates in a degraded mode because not taking this into consideration amounts to making the assumption that the engine can always deliver a high power. However, every internal combustion engine is limited on torque because it is limited on power. Failure to take this into consideration makes the control weak, degrades the service at heavy loads and limits vehicle performance.

The present invention is aimed at preventing the internal combustion engine from becoming saturated.

To this end, it proposes in that the wheel torque reference be corrected if the internal combustion engine becomes saturated, so as to prevent the engine from becoming saturated.

As a preference, the wheel torque reference is corrected as a function of an instantaneous torque saturation value and of a vector containing an estimate of the state of the transmission in its entirety, in conjunction with the internal combustion engine and the wheels.

According to one particular embodiment of the invention, this vector contains at least one estimate of the engine speed, of the wheel torque, of the speeds of the electric machines, of the gearbox input torque, of the wheel speed, of the internal combustion engine frictional drag torque, or of the wheel frictional drag torque.

The invention also relates to a device for controlling a transmission having an internal combustion engine torque antisaturation unit capable of correcting a wheel torque reference.

Figure 2:
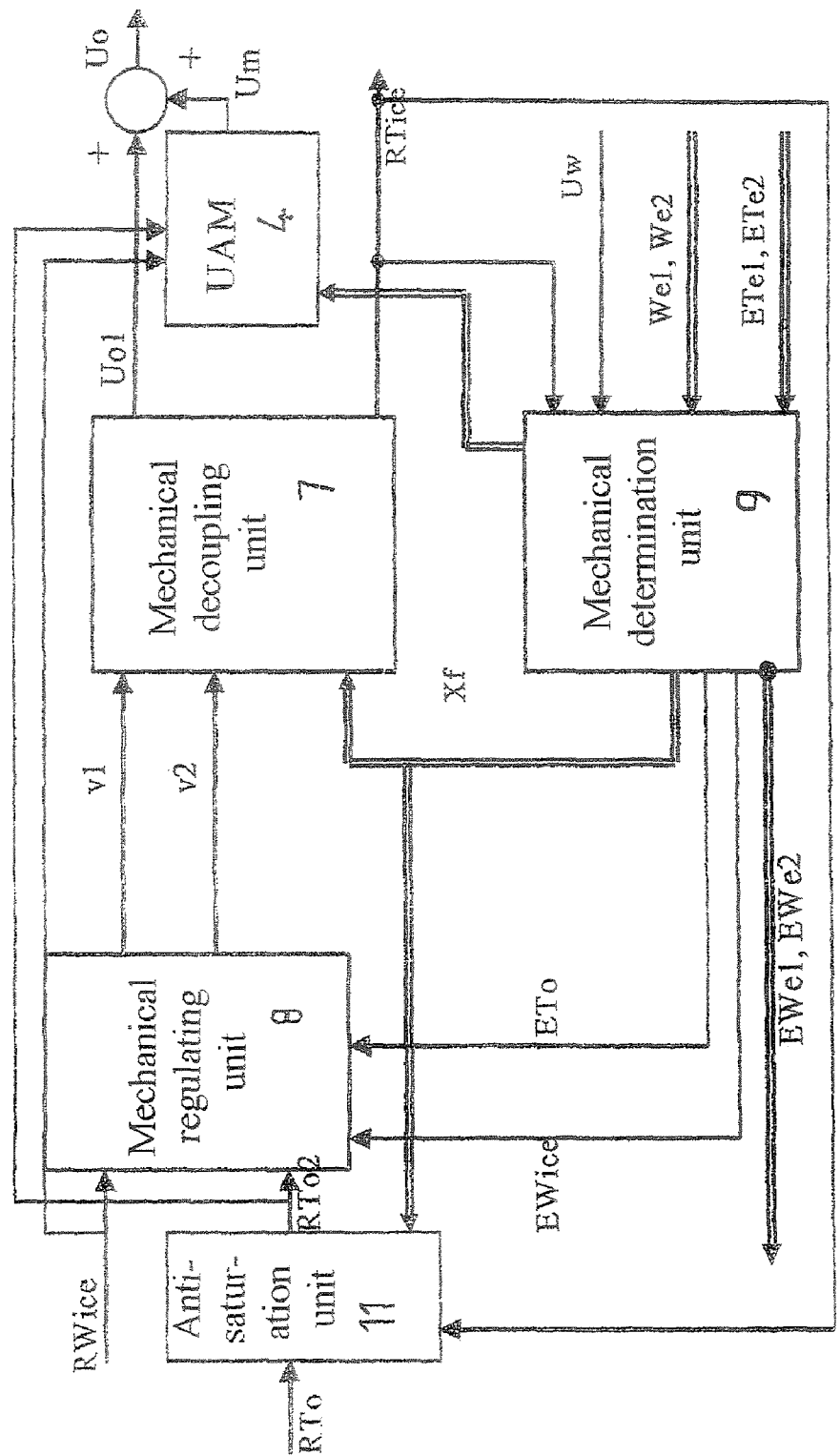

Other features and advantages of the present invention will become clearly apparent from reading the following description of one nonlimiting embodiment thereof, with reference to the attached drawings, in which:

FIG. 1 is a typical block diagram of an infinitely variable transmission to which the invention applies; and FIG. 2 shows the mechanical control structure used.

FIG. 1 schematically depicts an infinitely variable transmission with electric variator having two parallel power transmission lines for transmitting power between the internal combustion engine 1 and the wheels 6, as described in publication FR 2 823 281 to which reference may be made. The main power line comprises a drivetrain with fixed gear ratio, and the line known as the power take-off line includes two electric machines 2, 3 constituting the variator. The diagram makes reference to some physical quantities explained hereinbelow, namely: Tice, Ti, Wice, Te1, Te2, We1, We2, To, Wwh and Tres.

These physical quantities which characterize the overall behavior of the propulsion unit equipped with its infinitely variable transmission with electric variator as mentioned in the diagrams are as follows.

For the internal combustion engine:
Tice: engine torque applied to the crankshaft,
Wice: engine speed
For the flywheel:
Ti: gearbox input torque
Wi: flywheel output speed
For the power take-off:
Te1: torque at the first electric machine 2
We1: speed of the first electric machine 2
Te2: torque at the second electric machine 3
We2: speed of the second electric machine 3
Ucapa: voltage across the energy storage element
For the differential:
Wo: drivetrain output speed
To: torque at the wheel or wheel torque
For the wheel:
Wwh: wheel speed.

The transmission is placed under the control of a control system combining a mechanical control device described in FIG. 2, which achieves the mechanical objectives, namely regulates the wheel torque To and the internal combustion engine speed Wice.

The energy objectives are achieved via a different route using an energy control unit, not described, of which only the output signals that interact with the mechanical control are mentioned:
- Uw: energy command expressed as a function of Te1, Te2, We1 and We2,
- ETe1: estimate of the torque at the first electric machine,
- ETe2: estimate of the torque at the second electric machine.

According to the invention, the mechanical control unit is itself made up of five units or modules, grouped together in FIG. 2, with the various signals associated with them: a mechanical determination unit 9, a mechanical regulating unit 8, a mechanical decoupling unit 7, a torsion mode damping unit 4 and an antisaturation unit 11.

The function of the mechanical determination unit 9 is to inform the other mechanical control units of the state of the system. To do this, it uses the speed measurements We1, We2 pertaining to the speeds of the electric machines 2, 3, and the energy command Uw which is expressed as a function of the respective torques ETe1, ETe2 of these machines. The unit 9 also uses a signal RTice originating from the mechanical decoupling unit and which represents the engine torque setpoint transmitted to the engine management unit.

From these measurements and signals, the mechanical determination unit calculates the following quantities:
- EWice: estimate of engine speed,
- ETo: estimate of wheel torque,
- EWe1, EWe2: estimates of the speeds of the electric machines, and
- an estimation vector Xf which comprises the above estimates together with ETi which is an estimate of the torque Ti exchanged between the engine and the gearbox, an estimate of the wheel speed EWwh, an estimate of the internal combustion engine frictional drag torque ETdice and an estimate of the wheel frictional drag torque ETres.

Finally, the vector Xf combines the following signals: Xf=[EWice, EWwh, EWe1, EWe2, ETi, ETO, ETdice, ETres].

According to the invention, the vector Xf contains at least an estimate of the engine speed EWice, of the wheel torque ETo, of the speeds of the electric machines EW1 and EW2, of the gearbox input torque ETi, of the wheel speed EWwh, of the internal combustion engine frictional drag torque ETdice, or of the wheel frictional drag torque Etres. It contains an estimate of the state of the transmission in its entirety, in conjunction with the internal combustion engine and the wheels. This estimate is fed to the other mechanical control units.

Calculating all these estimates is made possible by the known techniques involved in observing and estimating in dynamic systems, and is based on a customary mathematical model of the dynamic behavior of the propulsion unit.

The mechanical regulating unit 8 calculates two intermediate command signals v1 and v2 from the engine speed reference RWice, the wheel torque reference RTo, the engine speed estimate EWice and the wheel torque estimate (ETo):
- The signal v1 is calculated by a regulator from the internal combustion engine speed setpoint RWice and from the internal combustion engine speed estimate EWice.
- The signal v2 is also calculated by a regulator from the wheel torque setpoint RTo and from the wheel torque estimate ETo.

The parameters for these two regulators are mechanical regulating unit regulating parameters which determine the extent to which the quantities Wice and To reflect the setpoints RWice and RTo.

The mechanical decoupling unit 7 calculates a command Uo1 and an internal combustion engine torque setpoint RTice from the intermediate commands v1 and v2 and from the estimation vector Xf emanating from the mechanical determination unit.

The torsion mode damping unit 4 (UAM) calculates a command complement Um which is added to Uo1. Um is dependent on the signals RWice, RTo and on the vector Xf. The command complement Um is supposed to damp the oscillating modes caused by the stiffnesses. This command is added to the command Uo1, calculated by the mechanical decoupling unit, to obtain the final command Uo calculate one. The command Uo1 is converted into electric command torques Te1 and Te2.

Finally, the mechanical control device comprises an internal combustion engine torque antisaturation unit 11 which will correct the wheel torque setpoint RTo on the basis of the reference RTice and the vector Xf, so that the engine torque is no longer saturated. Thanks to this unit, the wheel torque reference RTo is corrected if the internal combustion engine becomes saturated, so as to eliminate this saturation.

The way in which this unit works is as follows. When the internal combustion engine reaches saturation, this means that the current transmission operating point RWice,To has called for too much engine power, causing the torque RTice to become saturated. According to the invention, the strategy employed by the antisaturation unit consists in:
- detecting engine torque saturation against a saturation threshold RTice_max
- if there is no saturation (RTice<RTice_max), the torque setpoint transmitted to the wheels RTo2 is not corrected and remains the reference RTo for the current operating point,
- if there is saturation (TRice>RTice_max) adapting the setpoint RTo2 on the basis of a transmission power balance. The wheel torque reference (RTo) is corrected as a function of an instantaneous torque saturation value RTice and of a vector Xf containing an estimate of the state of the transmission in its entirety, in conjunction with the internal combustion engine and the wheels.

Thus, the wheel torque reference RTo can be corrected as a function of an instantaneous torque saturation value RTice and of a vector Xf containing an estimate of the state of the transmission in its entirety, in conjunction with the internal combustion engine and the wheels. The instantaneous torque saturation value RTice is compared with a threshold RTice_max.

If RTice is greater than RTice_max, the wheel torque setpoint RTo2 is recalculated from the reference RTo in order to ensure that the power at the wheel is less than or equal to the power supplied by the internal combustion engine.

The power supplied by the engine can be estimated by the mechanical determination unit by applying a matching gain G less than one, recalculated at each instant, to the power supplied by the internal combustion engine: Power_wheel=G× Power_engine.

The power at the wheel (the torque multiplied by the speed) is RTo2×EWwh (the estimate of the speed at the wheels). The maximum engine power is [RTice_max×EWice]−[ETdice× EWice], which represents the difference between a nominal power that the engine can achieve and an estimate of the power dissipated by frictional drag in the transmission. The maximum engine power taken into consideration is therefore the difference between a nominal power that the engine can achieve and an estimate of the frictional drag in the transmission.

According to the invention, when saturation is detected, the new wheel torque setpoint RTo2 can be calculated as follows:
initializing the gain G using a formula of the type:

$$G=0.9\times EWh\times RTo/EWice\times RTice\_max,$$

where G represents an alterable percentage of the ratio of power between the wheels and the engine,
actually calculating RTo2 using a principal of power balance between the wheels and the engine such as:

$$Rto2=G\times[(RTice\_max\times Ewice)-(ETdice\times Ewice)]/EWwh.$$

To sum up, calculation of the wheel torque setpoint RTo2 involves steps of initializing the gain (G) and of actually calculating RTo2 using a principal of power balance between the wheels and the engine.

Finally, if the aforementioned calculation does not eliminate torque saturation, then G can be adapted by arbitrarily reducing it by a small adjustable value such as 0.001.

The invention claimed is:

1. A method for controlling an infinitely variable transmission with an electric variator, including an internal combustion engine and at least two electric machines, the method comprising:
    calculating an instantaneous operating point of the transmission as defined by an internal combustion engine speed reference and a wheel torque reference pertaining to torque at the wheel; and
    correcting wheel torque reference if the internal combustion engine becomes saturated, so as to eliminate the saturation.

2. The control method as claimed in claim 1, wherein the wheel torque reference is corrected as a function of an instantaneous torque saturation value and of a vector containing an estimate of a state of the transmission in its entirety, in conjunction with the internal combustion engine and the wheels.

3. The control method as claimed in claim 2, wherein the vector contains at least one estimate of the engine speed, of wheel torque, of speeds of the electric machines, of gearbox input torque, of wheel speed, of internal combustion engine frictional drag torque, or of wheel frictional drag torque.

4. The control method as claimed in claim 2, wherein the instantaneous torque saturation value is compared with a threshold.

5. The control method as claimed in claim 4, wherein if the instantaneous torque saturation value is greater than the threshold, the wheel torque setpoint is recalculated from the wheel torque reference to ensure that power at the wheel is less than or equal to power supplied by the internal combustion engine.

6. The control method as claimed in claim 5, wherein the power of the wheel is estimated by applying a matching gain less than one, recalculated at each instant, to the power supplied by the internal combustion engine.

7. The control method as claimed in claim 6, wherein maximum engine power taken into consideration is the difference between a nominal power that the engine can achieve and an estimate of frictional drag in the transmission.

8. The control method as claimed in claim 6, wherein calculation of the wheel torque setpoint includes initializing a gain and actually calculating the wheel torque setpoint using a principal of power balance between the wheels and the engine.

9. The control method as claimed in claim 8, wherein if the calculation does not eliminate torque saturation, the gain is chosen arbitrarily.

10. A device for controlling a transmission that regulates torque at wheels and a combustion engine speed of an infinitely variable transmission with an electrical variator, including an internal combustion engine and at least two electric machines, the device comprising:
    a combustion engine torque antisaturation unit configured to correct a wheel torque reference.

11. The control device as claimed in claim 10, wherein the antisaturation unit transmits a corrected wheel torque setpoint to a mechanical regulating unit that calculates intermediate commands from the corrected torque setpoint and from an engine speed reference.

12. The control device as claimed in claim 11, further comprising a mechanical decoupling unit that calculates a command for the electric machines and a torque setpoint for the internal combustion engine.

13. The control device as claimed in claim 12, further comprising a torsion mode damping unit that supplies a command compliment added to the command setpoint to damp oscillating modes that are introduced by stiffness in the transmission.

* * * * *